Oct. 29, 1940.                T. A. RICH                2,219,939
BRIDGE ARRANGEMENT
Filed March 1, 1939
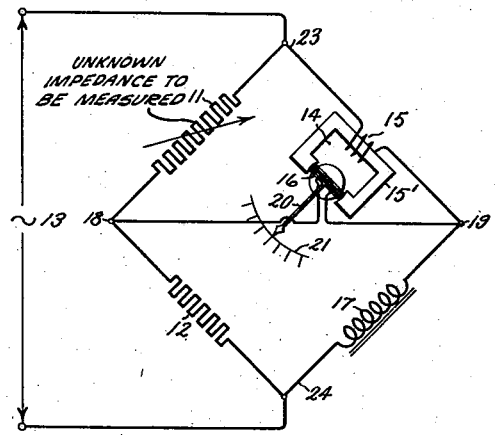
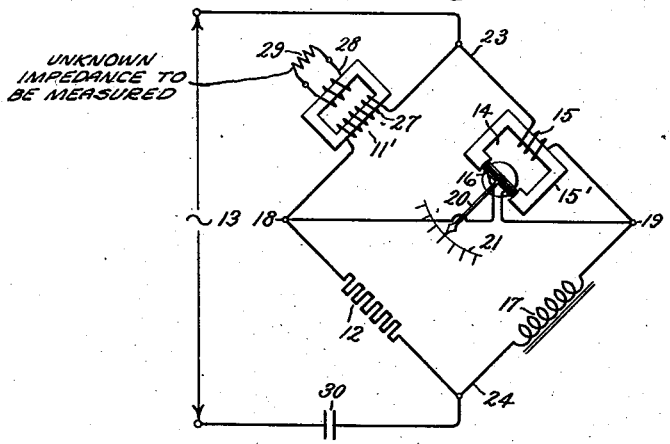
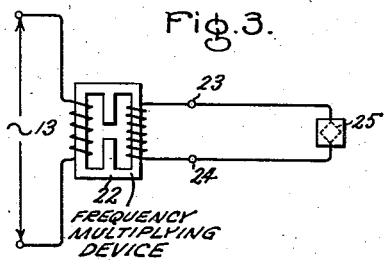
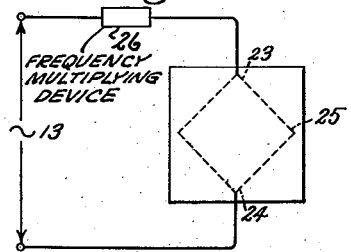
Inventor:
Theodore A. Rich,
by Harry E. Dunham
His Attorney.

Patented Oct. 29, 1940

2,219,939

UNITED STATES PATENT OFFICE 2,219,939

BRIDGE ARRANGEMENT

Theodore A. Rich, Schenectady, N. Y., assignor to General Electric Company, a corporation of New York Application March 1, 1939, Serial No. 259,206

2 Claims. (Cl. 171—95)

My invention relates to electrical measuring instruments and concerns particularly apparatus for measuring impedance and resistance.

It is an object of my invention to provide a self-balancing bridge for measuring resistance or for measuring impedance in which the indicating element draws no current in the position of balance and in which the apparatus is independent of variations in voltage or in frequency.

It is also an object of my invention to provide such apparatus for measuring temperature.

Another object of my invention is to provide apparatus responsive to variations in resistance, impedance or temperature and which may be energized by alternating current circuits.

Other and further objects and advantages will become apparent as the description proceeds.

In carrying out my invention in its preferred form I arrange a Wheatstone bridge circuit with the stationary coil of a dynamometer instrument serving as one of the arms of the bridge and the resistance or impedance to be measured as another arm of the bridge and I connect the movable coil of the instrument as the cross arm of the bridge so that the movable coil has impressed across it the voltage due to bridge unbalance, at the same time there may be a voltage induced in the movable coil due to current flowing in the stationary coil. The arrangement is such that the currents produced by the two causes tend to deflect the movable coil in opposite directions and to bring the coil to a position of rest in which the voltages are equal and opposite so that there is no torque producing current in the moving coil. The indication of the instrument, accordingly, represents the degree of unbalance of the bridge circuit, which depends on the resistance measured, and since no current is flowing, the indication is independent of voltage and frequency of the supply source.

The invention may be understood more readily from the following detailed description when considered in connection with the accompanying drawing and the features of the invention which are believed to be novel and patentable will be pointed out in the claims appended hereto.

In the drawing Fig. 1 is a circuit diagram schematically representing one embodiment of my invention and Fig. 2 is a circuit diagram of another embodiment of my invention which is particularly adapted to a measurement of low resistance. Figs. 3 and 4 are circuit diagrams of other embodiments of my invention designed to operate upon low frequency circuits without sacrifice of sturdiness and ruggedness of construction.

In the arrangement of Fig. 1 I have represented at 11 a current carrying element the resistance of which is to be measured. The element 11 is connected in series with a standard resistor 12 of fixed resistance to form two resistance arms of a bridge. A source of alternating current 13 is connected thereto for energizing the bridge. A dynamometer type instrument 14 which may be of the type described in United States Patent 1,976,498—Hoare and Parker, for example, is provided having a stationary coil or winding 15 on a laminated iron yoke 15' and a movable coil or winding 16. A reactor or inductor 17 is also provided which is connected in series with the winding 15 to the current source 13 to form inductive arms of a bridge. The movable coil 16 is connected between the common point 18 of the bridge arms 11 and 12 and the common point 19 of the bridge arms 15 and 17 to form a diagonal or cross arm of the bridge. The dynamometer instrument 14 may be constructed in the manner of current responsive dynamometer type devices known to those skilled in the art having, for example, a shaft, not shown, upon which the movable coil 16 is mounted so as to be rotatable and carrying a pointer 20 cooperating with a scale 21. My invention, however, is not limited to use with an indicating instrument and obviously includes use with any suitable current responsive device such as recorders, telemeters and contact-making instruments. It will be understood that a suitable means is required for conducting the current to the coil 16, such as lead-in spirals, not shown, but for maximum sensitivity in my apparatus the movable element 16 is preferably arranged without biasing springs and the lead-in springs are preferably of negligible torque so that the movable element is substantially free to float in any position. On the other hand, a light biasing spring arranged to sweep the pointer to or beyond one end of the scale or the other in case of voltage failure may be provided if it is desired to prevent the moving element from remaining in the position which it last reached, for in the case of voltage failure changing the value of the impedance to be measured would have no effect on the instrument indication.

The principle of operation of the apparatus will be apparent from the following considerations. Since the bridge arms 15 and 17 are both inductive, the voltages therein will both lead the current by substantially 90 degrees and will, therefore, have substantially the same phase relationships so that they will be substantially in phase with the voltage of the source 13. Since the arms 11 and 12 are substantially pure resistance the voltages therein will also be substantially in phase with the voltage of the source 13. Consequently the voltage between the points 18 and 19 will be either in phase or substantially 180 degrees out of phase with the voltage of the supply source in case the bridge should be unbalanced.

Current flowing in the stationary coil 15 of the dynamometer instrument 14 tends to induce a current in the movable coil 16 except when the movable coil 16 is in the position illustrated, which is the position of minimum mutual inductance. If the coil 16 is not in the position of minimum mutual inductance, the direction of the current induced is such as to deflect the coil to the position of minimum mutual inductance in accordance with the well-known electromagnetic principle that two relatively movable inductive coils tend to assume the position of minimum mutual inductance when current is passed through either. Current produced in the coil 16 by any voltage difference between the points 18 and 19, however, tends to deflection of the coil 16 from the position of minimum mutual inductance to the position of maximum inductance by motor action in accordance with the principle of operation of a watt meter, and such current tends to flow in the opposite direction to the current induced by the current in the stationary coil 15. Accordingly, the coil 16 is deflected from the position of minimum mutual inductance to the position in which sufficient current is induced by the stationary coil 15 to balance exactly the current produced by voltage difference between the points 18 and 19 and the position assumed represents the degree of unbalance of the bridge serving as a measure of the resistance 11. Since in this position no net current is flowing in the coil 16, it will be apparent its position is not dependent upon the magnitude of the current supplied by the source 13. The voltage ratios are not affected by variations in voltage and frequency of the source 13, and any change in the currents flowing in the outside arms of the bridge can have no effect on the cross arm of the bridge, and consequently no effect on the position of the pointer. It will thus be seen that I have provided a self-balancing bridge operating on the null principle. The operation is therefore independent of variations in voltage and frequency of the supply source.

It has been assumed in the foregoing explanation that the arms 11 and 12 are pure resistances and that the arms 15 and 17 are pure inductances. However, it will be understood that the same explanation would be applicable if the arms 11 and 12 were impedances with either inductive or capacitive components having substantially the same power factor, and if the arms 15 and 17 had some unavoidable resistance, but substantially the same power factor. Although I prefer to have the series connected arms with power factor substantially equal in order to obtain the maximum sensitivity for a given limiting current and in order to obtain the most accurate calibration of the instrument, it will be understood that exact quality is not necessary since lack of uniformity in power factor in either pair of series bridge arms will result primarily in out-of-phase current components in the cross arm which have no effect. Furthermore, the apparatus will still operate to indicate, as distinguished from accurately measuring, unbalance of the circuit even with widely different power factor of the various bridge arms.

When the apparatus is to be used for measurement of temperature, the resistance arm 11 is preferably composed of material which varies in resistance with temperature and is placed at a position where the temperature is to be measured.

Although the apparatus is independent of the effect of variations in voltage and frequency, I find it easier to construct rugged, sturdy instruments where the frequencies exceed the usual commercial frequencies. For example, at a frequency of approximately 800 cycles rugged, inexpensive instruments may readily be constructed. However, the apparatus may also be employed with either considerably higher or considerably lower frequencies. If it is desired to obtain the advantages of maximum economy of construction of the instrument when low frequency circuits are to be used for energizing the apparatus, I may interpose frequency multiplying devices between the input to the bridge and the current source. For example, in the arrangement illustrated in Fig. 3, a frequency multiplying transformer 22 which may, for example, be of the saturated secondary core or peaking type is provided, which is connected on the primary side to the alternating current source 13 and on the secondary side to the input terminals 23 and 24 of the bridge 25. In connection with three-phase circuit the well-known frequency-triphasing transformer may be used. Instead of utilizing the frequency multiplying transformer 22 I may interpose a device 26 in series with source 13 of the bridge 25 for introducing high frequency harmonics or components in the current supplied to the bridge 25. The device 26 may take the form of a saturated reactor or of a non-linear resistance such as that described in the Patent 1,822,742 to McEachron in which the ratio of voltage to current varies with voltage so that numerous odd harmonic components may be introduced as explained in the copending application of Cramer W. La Pierre Serial Number 65,998, filed February 27, 1936, and assigned to the same assignee as the present application. The resistance material employed may be a mixture of silicon carbide and carbon with a suitable binder or silicon carbide mixed with other conducting materials such as tungsten, molybdenum, and the like. A vacuum tube oscillator, tuned to the desired high frequency output and modulated at the commercial input frequency may also be employed for frequency multiplication.

If it is desired to utilize a high resistance bridge or a high voltage circuit for measuring low values of impedance or resistance, the arrangement of Figure 2 may be employed in which one of the arms 11' of the bridge consists of a high voltage winding 27 of a transformer having a low voltage winding 28 to which an impedance 29 to be measured is connected having a low ohmic value.

In order to reduce the volt-ampere burden on the current source 13 a condenser 30 may, if desired, be connected in series with the source 13 and the bridge terminals 23 and 24.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. Self-balancing apparatus of the bridge type comprising in combination, a source of alternating current, a frequency multiplying transformer of the saturated secondary core type having a primary winding connected to the source of alternating current, and having a secondary winding, a pair of impedances connected to the secondary winding in series to form two outside arms of a Wheatstone bridge, a dynamometer type indicating instrument having a pair of relatively movable coils, an impedance connected in series with one of said relatively movable coils to said transformer secondary winding to form the two remaining outside arms of the Wheatstone bridge, the remaining coil of said instrument being connected between the common points of the series connected elements to form a cross arm of the bridge, whereby currents flowing in the arms of the bridge including the instrument coil induce current in the cross-arm coil of the instrument, tending to bring the instrument to the position of minimum mutual inductance, and any currents in the cross arm produced by unbalance of the bridge tend to bring the coils in the position of maximum mutual inductance so that the instrument assumes the position in which the currents are balanced, thereby indicating bridge balance independently of voltage or frequency fluctuations of the supply source.

2. Self-balancing apparatus of the bridge type comprising in combination, a source of alternating current, a pair of impedances operatively connected in series relation thereto to form two opposite arms of a Wheatstone bridge, means interposed between said pair of impedances and said source of alternating current for multiplying the frequency thereof, a dynamometer type indicating instrument having a pair of relatively movable coils, and an impedance connected in series with one of said coils across the end terminals of said first-mentioned pair of impedances to form two additional outside arms of the Wheatstone bridge, the remaining coil of said instrument being connected between the common points of the series connected elements to form a cross arm of the bridge, whereby currents flowing in the second pair of arms of the bridge induce current in the cross-arm coil of the instrument, tending to bring the instrument to the position of minimum mutual inductance, and any currents in the cross arm produced by unbalance of the bridge tend to bring the coils in the position of maximum mutual inductance so that the instrument assumes the position in which the currents are balanced, thereby indicating bridge balance independently of voltage or frequency fluctuations of the supply source.

THEODORE A. RICH.